United States Patent
Nemoto et al.

(10) Patent No.: US 9,209,460 B2
(45) Date of Patent: Dec. 8, 2015

(54) CATHODE MATERIAL FOR LITHIUM ION SECONDARY BATTERIES, CATHODE MEMBER FOR LITHIUM ION SECONDARY BATTERIES, AND LITHIUM ION SECONDARY BATTERY

(75) Inventors: Atsushi Nemoto, Hamura (JP); Hirokazu Sasaki, Tokyo (JP); Masahiko Miyahara, Hamura (JP)

(73) Assignee: SHOEI CHEMICAL INC., Tokyo (JP)

( * ) Notice: Subject to any disclaimer, the term of this patent is extended or adjusted under 35 U.S.C. 154(b) by 22 days.

(21) Appl. No.: 14/342,257

(22) PCT Filed: Aug. 31, 2012

(86) PCT No.: PCT/JP2012/072109
§ 371 (c)(1), (2), (4) Date: Feb. 28, 2014

(87) PCT Pub. No.: WO2013/035633
PCT Pub. Date: Mar. 14, 2013

(65) Prior Publication Data
US 2014/0227597 A1    Aug. 14, 2014

(30) Foreign Application Priority Data
Sep. 5, 2011   (JP) .................................. 2011-192578

(51) Int. Cl.
*H01M 4/505* (2010.01)
*H01M 4/136* (2010.01)
*H01M 4/58* (2010.01)
*H01M 4/525* (2010.01)
*H01M 4/02* (2006.01)

(52) U.S. Cl.
CPC .............. *H01M 4/505* (2013.01); *H01M 4/136* (2013.01); *H01M 4/525* (2013.01); *H01M 4/5825* (2013.01); *H01M 2004/028* (2013.01); *Y02E 60/122* (2013.01)

(58) Field of Classification Search
CPC ..... H01M 4/136; H01M 4/505; H01M 4/525; H01M 4/5825; H01M 2004/028
See application file for complete search history.

(56) References Cited

U.S. PATENT DOCUMENTS

2012/0301781 A1* 11/2012 Kang et al. .................... 429/211

FOREIGN PATENT DOCUMENTS

| JP | 2001-266882 A | 9/2001 |
|---|---|---|
| JP | 2002-075364 A | 3/2002 |
| JP | 2003-034534 A | 2/2003 |
| JP | 2003-059491 A | 2/2003 |
| JP | 2003-272632 A | 9/2003 |
| JP | 2004-234977 A | 8/2004 |
| JP | 2005-519451 A | 6/2005 |
| JP | 2006-302671 A | 11/2006 |
| JP | 2007-335325 A | 12/2007 |
| JP | 2009-170401 A | 7/2009 |
| JP | 2010-108678 A | 5/2010 |
| WO | WO 2010/089931 A1 | 8/2010 |

OTHER PUBLICATIONS

PCT International Preliminary Report on Patentability issued Mar. 12, 2014 for PCT/JP2012/072109.
PCT Written Opinion of the International Searching Authority issued Nov. 6, 2012 for PCT/JP2012/072109.
J. Moskon et al; Morphology and electrical properties of conductive carbon . . . ; Journal Power Sources, vol. 174, 2007, pp. 683-688.
R. Dominko et al; Structure and electrochemical performance of Li2MnSiO4 and Li2FeSiO4 as . . . ; Electrochem. Commun., vol. 8, 2006, pp. 217-222.
S. Bin et al; Preparation of Li2FeSiO4/C composites and its electrochemical properties; Proceedings of the 50th battery symposium; 2009, p. 111.
S. Bin et al; Preparation of Li2FeSiO4/C composites and its electrochemical properties; Proceedings of the 51st battery symposium; 2010, p. 211.
Y. Li et al; Synthesis and characterization of Li2MnSiO4/C nanocomposite cathode . . . ; Journal Power Sources, vol. 174, 2007, pp. 528-532.
A. Kojima et al; Charge-discharge performance fo Li-ion battery with Li2M3iO4 . . . ; Proceedings of the 51st battery symposium; 2010, p. 194.
Y. Kamimura et al; Synthesis and electrochemical properties of silicate . . . ; Proceedings of the 50th battery symposium; 2009, p. 30.
N. Kuganathan et al; Li2MnSio4 lithium battery material: atomic-scale study of defects, . . . ; Chem. Mater., vol. 21, 2009; pp 5196-5202.
T. Toyama et al; Electrochemical properties of V-substituted . . . ; Battery symposium in Japan, 2011, p. 161.
International Search Report dated Nov. 6, 2012.

* cited by examiner

*Primary Examiner* — Muhammad Siddiquee
(74) *Attorney, Agent, or Firm* — Lucas & Mercanti, LLP

(57) ABSTRACT

A cathode material for a lithium ion secondary battery includes an oxide represented by a composition formula $Li_{2+x}(M,M^A)(Si,M^B)O_4$, wherein M represents at least one element selected from the group consisting of Fe, Mn, Co and Ni; $M^A$ and $M^B$ represent elements substituted for parts of M and Si, respectively, to compensate for an electric charge equivalent to x of $Li^+$; and at least one of $M^A$ and $M^B$ is included. In the composition formula representing the oxide, $0 < x \leq 0.25$.

9 Claims, 1 Drawing Sheet

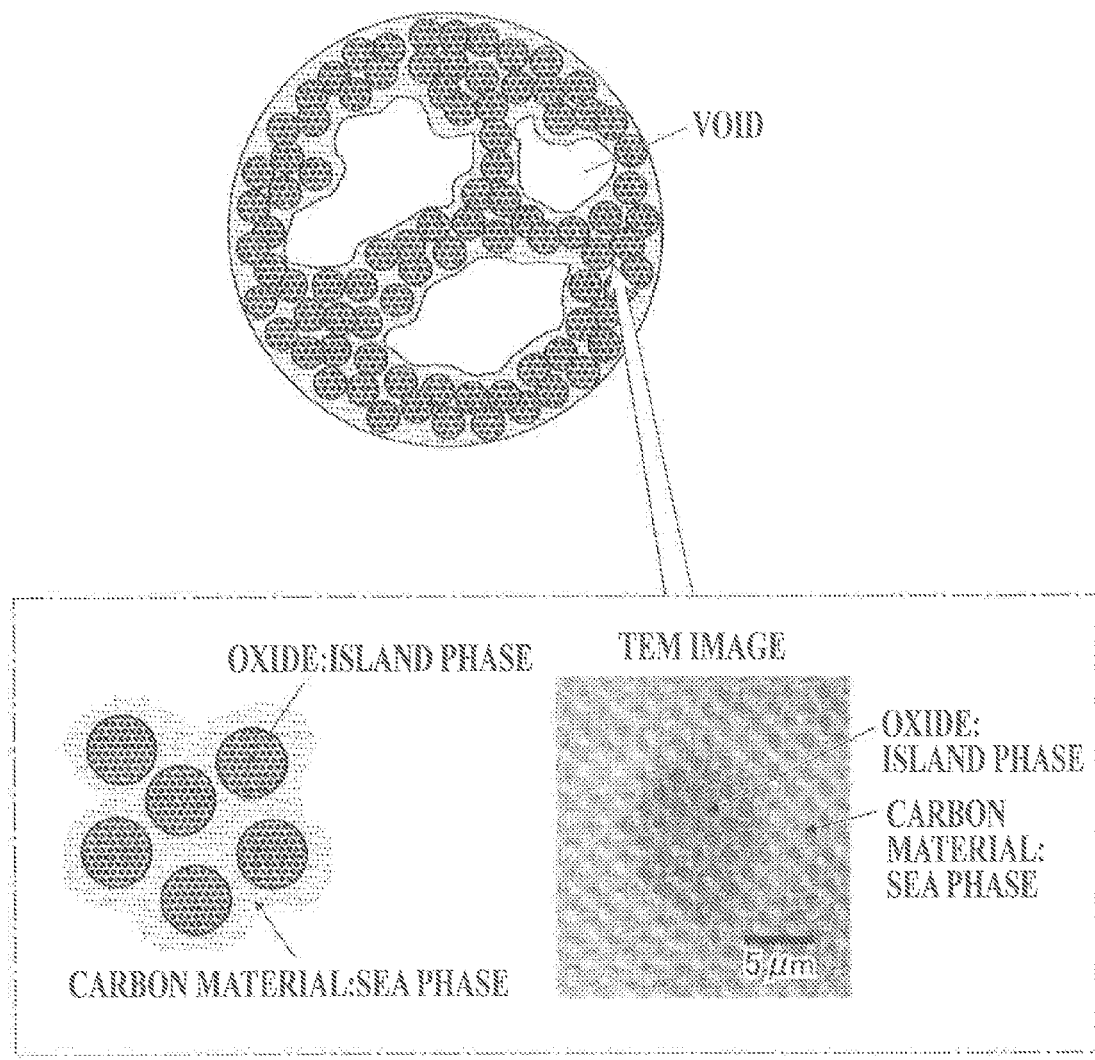

CATHODE MATERIAL FOR LITHIUM ION SECONDARY BATTERIES, CATHODE MEMBER FOR LITHIUM ION SECONDARY BATTERIES, AND LITHIUM ION SECONDARY BATTERY

CROSS REFERENCE TO RELATED APPLICATION

This Application is a 371 of PCT/JP2012/072109 filed on Aug. 31, 2012 which, in turn, claimed the priority of Japanese Patent Application No. JP2011-192578 filed on Sep. 5, 2011 both applications are incorporated herein by reference.

TECHNICAL FIELD

The present invention relates to a cathode material for lithium ion secondary batteries, a cathode member for lithium ion secondary batteries, and a lithium ion secondary battery.

BACKGROUND ACT

A lithium ion secondary battery has less weight and more capacity as compared with a conventional read secondary battery, a nickel-cadmium secondary battery and so forth and hence has been widely used as a power source for electronic devices such as a mobile phone and a notebook type personal computer. It has recently been used also as a battery for an electric vehicle, a plug-in hybrid car, a pedelec and so forth.

The lithium ion secondary battery is basically composed of a cathode, an anode, an electrolyte, and a separator.

For the anode, in general, carbon, lithium titanate or the like which allows metallic lithium or lithium ion intercalation/deintercalation is used. For the electrolyte, lithium salt and an organic solvent or an ionic liquid capable of dissolving the lithium salt are used. The separator is placed between the cathode and the anode so as to keep electrical insulation therebetween and has pores to allow the electrolyte to pass through. For the separators porous organic resin, glass fiber or the like is used.

The cathode is basically composed of an active material which allows lithium ion intercalation/deintercalation, an electrically conductive auxiliary which ensures an electrical conduction path (electron conduction path) to a current collector, and a binder which binds the active material and the electrically conductive auxiliary. As the electrically conductive auxiliary, a carbon material such as acetylene black, carbon black or graphite is used, as the active material of the cathode material, a metal oxide composed of lithium and a transition metal (s), such as $LiCoO_2$, $LiNiO_2$, $LiNi_{0.8}Co_{0.2}O_2$ or $LiMn_2O_4$, is used. Other examples are $LiMPO_4$, derivatives obtained from this lithium metal phosphate as the basic structure by element substitution or compositional change, $Li_2MSiO_4$, derivatives obtained from this lithium metal silicate as the basic structure by element substitution or compositional change, $LiMBO_3$, and derivatives obtained from this lithium metal borate as the basic structure by element substitution or compositional change. M mainly contains a transition metal element(s) having a variable valency, such as Fe, Mn, Ni, and Co.

This kind of metal oxide generally has low electron conductivity, and hence, in the cathode which uses the metal oxide as the active material, the metal oxide is mixed with the electrically conductive auxiliary as described above. Efforts have been made to further improve the electron conductivity inside the cathode by coating the surface of the metal oxide as the active material with carbon or by making carbon particles, carbon fiber or the like adhere to the surface of the metal oxide, in addition to mixing the metal oxide with the electrically conductive auxiliary. (Refer to Patent Literatures 1 to 6 and bon-Patent Literature 1, for example.)

In particular, with respect to the metal oxide having significantly low electron conductivity, even if the cathode is configured by making the electrically conductive auxiliary and the metal oxide coexist therein, it is not enough to obtain excellent battery characteristics. Hence, in order to use such metal oxide, the surface of the metal oxide is coated, with carbon.

Among the oxides described above, $Li_2MSiO_4$ typified by lithium iron silicate and lithium manganese silicate and derivatives obtained from this lithium metal silicate as the basic structure by element substitution or compositional change each contain two lithium ions in one composition formula, so that high capacity can be expected theoretically. (Refer to Patent Literatures 7 to 11 and Non-Patent Literature 2.) Since each of these oxides has significantly low electron conductivity, an attempt to perform carbon coating has been made in addition to mixing the oxide with the electrically conductive auxiliary in an electrode. (Refer to don-Patent Literatures 3 to 5.)

RELATED ART LITERATURES

Patent Literatures

Patent Literature 1: Published Patent Application JP 2003-34534 A
Patent Literature 2: Published Patent Application JP 2006-302671 A
Patent Literature 3: Published Patent Application JP 2002-73364 A
Patent Literature 4: Published Patent Application JP 2003-272632 A
Patent Literature 5: Published Patent Application JP 2004-234977 A
Patent Literature 6: Published Patent Application JP 2003-59491 A
Patent Literature 7: Published Patent Application JP 2007-335325 A
Patent Literature 8: Japanese Translation of PCT International Application JP 2005-519451 A
Patent Literature 9: Published Patent Application JP 2001-266882 A
Patent Literature 10: Published Patent Application JP 2010-108678 A
Patent Literature 11: Published Patent Application JP 2009-170401 A

Non-Patent Literatures

Non-Patent Literature 1: J. Moskon, R. Dominko, R. Cerc-Korosec, M. Gaberscek, J. Jamnik, *J. Power Sources,* 174, (2007) 638-688.
Non-Patent Literature 2: R. Dominko, M. Bele, M. Gaberscek, A. Meden, M. Remskar, J. Jamik, *Electrochem. Commun.,* 8, (2006) 217-222.
Non-Patent Literature 3: Bin SHAO, Izumi TANIGUCHI, *Proceedings of The* 50*th Battery Symposium,* (2009) 111.
Non-Patent Literature 4: Bin SHAO, Izumi TANIGUCHI, *Proceedings of The* 51*st Battery Symposium,* (2010) 211.
Non-Patent Literature 5: Yi-Xiao Li, Zheng-Liang Gong, Yong Yang, *J. Power Sources,* 1.74, (2007) 528-532.

Non-Patent Literature 6: Akira KOJIMA, Toshikatsu KOJIMA, Takuhiro MIYUKI, Yasue OKUMURA, Tetsuo SAKAI, *Proceedings of the 51st Battery Symposium*, (2010) 194.

Non-Patent Literature 7: Yuichi KAMIMURA, Eiji KOBAYASHI, Takayuki DOI, Shigeto OKADA, Jun-ichi YAMAKI, *Proceedings of The 50th Battery Symposium*, (2009) 30.

SUMMARY OF THE INVENTION

Problems to be Solved by the Invention

As described above, in lithium iron silicate ($Li_2FeSiO_4$), lithium manganese silicate ($Li_2MnSiO_4$), and derivatives obtained from these as the basic structure by element substitution or compositional change, high capacity (330 mAh/g) can be expected theoretically or compositionally. In reality, however, not many reports have described achievement of an actual capacity of 1 Li (165 mAh/g) or more, and no report has described achievement of an actual capacity of 1.5 Li (247 mAh/g) or more. The capacity described in Patent Literature 7 is 60 to 130 mAh/g, and the actual capacities described in Hen-Patent Literatures 6 and 7 are 130 mAh/g and 225 mAh/g, respectively.

However, in reality, even if high actual capacity is obtained, the battery carrot obtain high voltage when internal resistance is high, and accordingly actual energy density is low. In addition, when the internal resistance is high, heat generation or a battery is large, and accordingly thermal design of a battery unit and so forth is difficult. Conventionally, because theoretical capacity is high with, lithium iron silicate or lithium manganese silicate, efforts have been made to increase the actual capacity. However, the present inventors have found out that not only increase of the actual capacity but also reduction of the internal resistance needs to be tackled.

The present invention has been conceived in view of the problem, and objects are to provide: a cathode material for lithium ion secondary batteries, containing an oxide for a theoretical capacity of 2 Li or more, the cathode material with which low internal resistance is obtained: and a cathode member for lithium ion secondary batteries and a lithium ion secondary battery each of which uses the cathode material for lithium ion secondary batteries.

Means for Solving the Problems

The present inventors have found out that the internal resistance can be reduced by making lithium ions excessive to an oxide represented by the composition formula $Li_2MSiO_4$ typified by lithium iron silicate, lithium manganese silicate and so forth.

That is, the present invention is summarized as follows.

(1) A cathode material for a lithium ion secondary battery including an oxide represented by a composition formula $Li_{2+z}(M,M^A)(Si,M^B)O_4$ (wherein M represents at least one element selected from the group consisting of Fe, Mn, Co and Ni; $M^A$ and $M^B$ represent elements substituted for parts of M and Si, respectively, to compensate for an electric charge equivalent to x of $Li^+$; and at least one of $M^A$ and $M^B$ is included), wherein in the composition formula represent leg the oxide, $0<x\leq0.25$.

(2) The cathode material for a lithium ion secondary battery according to (1), wherein a value of the x is a multiple of 0.03125.

(3) The cathode material for a lithium ion secondary battery according to (1) or (2), wherein the $M^A$ represents at least one element selected from Li, Na and K, and the $M^B$ represents at least one element selected from B, Al, Ga, In, Sc, Y, Mg, Ca, Na and K.

(4) The cathode material for a lithium ion secondary battery according to any one of (1) to (3), wherein the oxide is represented by a composition formula $Li_{2+z}Fe(Si,M^B)O_4$ or $Li_{2+x}Mn(Si,M^B)O_4$, wherein $M^B$ represents at least one element selected from B, Al and Ga.

(5) The cathode material for a lithium ion secondary battery according to any one of (1) to (4), wherein the cathode material is a composite composed of the oxide and a carbon material, and the composite shows a sea-islands structure in which the oxide is scattered like islands in the carbon material, and an average circle-equivalent diameter of the islands of the sea-islands structure is 3 nm or more and 15 nm or less.

(6) The cathode material, for a lithium ion secondary battery according to (5), wherein the composite is a grain having a size of 1 μm or more and 20 μm or less, and a void exists inside the grain.

(7) The cathode material for a lithium ion secondary battery according to (6), wherein the void having a sire of 200 nm or more and less than the size of the grain exists inside the grain.

(8) The cathode material for a lithium ion secondary battery according to (7), wherein an abundance of the void is 20% or more and 80% or less in terms of an area rate in a section of the grain.

(9) A cathode member for a lithium ion secondary battery including a metal foil provided with a cathode layer including; the cathode material for a lithium ion secondary battery according to any one of (1) to (8); and a birder.

(10) A lithium ion secondary battery including the cathode material for a lithium ion secondary battery according to any one of (1) to (8) or the cathode member for a lithium ion secondary battery according to (9).

Advantageous Effects of the Invention

According to the present invention, an excellent cathode material for lithium ion secondary batteries, the cathode material with which the internal resistance is reduced, can be provided. Further, a cathode member for lithium ion secondary batteries and a lithium ion secondary battery having low internal resistance can be provided.

BRIEF DESCRIPTION OF THE DRAWINGS

FIG. 1 shows a schematic view of the internal structure of a composite in the present invention and a TEM image of a rupture part thereof.

EMBODIMENT FOR CARRYING OUT THE INVENTION

A cathode material for lithium ion secondary batteries of the present invention contains an oxide represented by the composition formula $Li_{2+x}(M,M^A)(Si,M^B)O_4$ (wherein M represents at least one element selected from the group consisting of Fe, Mn, Co and Ni; $M^A$ and $M^B$ represent elements substituted for parts of M and Si, respectively, to compensate for an electric charge(s) equivalent to x of $Li^+$; and at least one of $M^A$ and $M^B$ is contained). In the composition formula representing the oxide, $0<x\leq0.25$.

That is, the internal, resistance car; be reduced by Scaring lithium excessive (more than 2 lithium) within a certain range as compared with a stoichiometric ratio of $Li_2MSiO_4$ which is a general composition formula of lithium iron silicate, lithium manganese silicate, lithium cobalt silicate, lithium nickel silicate and so forth.

The oxide represented by slue competition formula $Li_2MSiO_4$ typified by lithium iron silicate and lithium manganese silicate has a structure in which lithium ions are inserted between $MSiO_4$ sheets (layers) composed of M oxygen tetrahedra and Si oxygen tetrahedra sharing the apexes. The sheets are negatively charged in a state in which lithium ions are inserted therebetween, and it is considered that electrostatic attraction acts between the sheets through lithium cations.

As lithium ion deintercalation (delithiation) progresses through charge, the lithium ions existing between the sheets are reduced, and the negatively charged sheets lose the charges, approaching to an electric charge of 0. Accordingly, the electrostatic attraction between the sheets is reduced (or weakens), so that misalignment of the sheets easily occurs, it can be presumed that large misalignment of the sheets makes a path for lithium ions to transfer between the sheets intricate, so that lithium ion transfer becomes difficult and accordingly the internal resistance increases.

In the case of this kind of layer structure, electron transfer accompanying lithium ion intercalation/deintercalation is mainly performed within the faces of the sheets, so that it can be considered that electron transfer between the sheets is difficult. However, in a structure in which more (excessive) lithium ions are inserted between the sheets, the amount of lithium ions, other than the lithium ions which are intercalated/deintercalated through charge/discharge, remaining between the sheets increases, so that the electrostatic attraction fixes the sheets and accordingly misalignment of the sheets hardly occurs. That is, a diffusion path of lithium ions can be secured, and accordingly the internal resistance can be reduced. Further, the excessive lithium ions share the faces, so that electron transfer between the sheets Decodes easy through the lithium ions or oxygen coordination polyhedra of the lithium ions and accordingly the internal resistance is reduced.

Under this technical idee, it has been found out that the internal resistance can be reduced when an excess x of lithium ions is $0<x\leq0.25$. The internal resistance cannot be reduced if x is 0 or less. Lithium ions cannot be inserted between the sheets in such a way that x is sore than 0.25, in other words, reduction of the internal resistance does not progress any further even if x is more than 0.25.

It is preferable that the value of the excess x be a multiple of 0.03125 within the above-mentioned range. When the value is such a multiple, sublattices are formed, and accordingly the structure is more stable. Consequently, even when charge/discharge is repeated, the structure does not change easily and accordingly decrease of discharge capacity and increase of the internal resistance do not easily progress.

Electric-charge compensation for excessive lithium ions is performed by (i) substituting $M^A$ for M, (ii) substituting $M^B$ for Si, or combination of (i) and (ii).

$M^A$ is a monovalent element, examples thereof include Li, Na, and K. Among these, Li is preferable, $M^B$ is a trivalent element, a divalent element, or a monovalent element. Examples thereof include B, Al, Ga, In, Sc, Y, Mg, Ca, Zn, Cu, Na, and K. It is preferable that $M^A$ be at least one element selected from Li, Na, and K, and $M^B$ be at least one element selected from B, Al, Ga, In, Sc, Y, Mg, Ca, Na, and K.

It is preferable that the electric-charge compensation be performed by (ii). That is, in $Li_{2+x}Fe(Si,M^B)O_4$ or $Li_{2+x}(Si,$ $M^B)O_4$, $M^B$ as substituted for Si. It is further preferable that $M^B$ be at feast one of B, Al, and Ga in order to effectively reduce the internal resistance.

The present invention is a composite composed, of the oxide and a carbon material, and it is preferable that the composite show, as shown in FIG. 1, a sea-islands structure in which the oxide is scattered like islands in the carbon, material, and au average circle-equivalent diameter of the islands of the sea-islands structure be 3 nm or more and 15 nm or less.

In the composite, a plurality of regions composed of the oxide exist. In other words, the composite has a structure in which the carbon material lies as a matrix (bulk) and the regions composed of the oxide are scattered (discrete). Hence, electron transfer to/from the regions, which occurs accompanying lithium ion intercalation/deintercalation to/from the regions, can be performed through the carbon material, so that all the regions act as an active material. Thereby, higher actual capacity can be realised. When the regions are small, the distance through which lithium ion diffusion in solid is performed as short and accordingly the actual capacity tends to be high. The electrical conductivity of the oxide is very low. Hence, in order to obtain high actual capacity with a practical charge/discharge duration, the crystal grain sire needs to be equal to or leas than the distance through which lithium ion diffusion in solid can be performed within the charge/discharge duration.

More specifically, when the circle-equivalent diameter of the projected areas of the regions composed, of the oxide in the composite is 15 nm or less, higher actual capacity is obtained. If the diameter is sore than 15 nm, the distance through which lithium ion diffusion in solid is performed is longer, and lithium ions cannot diffuse within the practical charge/discharge duration, so that high actual capacity is unavailable in some cases. The lower limit of the diameter is the minimum size down to which lithium ions can be easily kept in the oxide structure. That is, if the diameter is less than 3 nm, keeping lithium ions in the oxide structure is difficult in some cases.

The regions composed of the oxide in the composite are observable with a transmission electron microscope. The circle-equivalent diameter of the projected areas thereof can be calculated by observation with a transmission electron microscope and image processing.

More specifically, a transmission electron microscope image is subjected to thresholding, observed regions each are converted to the area of a circle, and the circle-equivalent diameter can be obtained by calculating the average value or the diameters of the circles. The circle-equivalent diameter is a number average value of 20 or more diameters thereof. In general, the circle-equivalent diameter is a number average value of 50 diameters thereof.

It is preferable that the carbon material content be 2 mass % or more and 25 mass % or less in the cathode material for lithium ion secondary batteries of the present invention.

If the carbon material content is less than 2 mass %, a sufficient elect roe conduction path to a current collector is impossible to secure in some cases, and hence excellent battery characteristics are unavailable in some cases. On the other hand, if the carbon material content is more than 25 mass %, the ratio of the active material, content to a produced electrode is small, and hence high battery capacity is unavailable in some cases depending on the way or purpose of battery design. The above-mentioned range secures excellent battery characteristics easily and widens a range of selection of the battery design.

The carbon, material, in the present invention contains elemental carbon, and it is preferable that graphitic skeletal carbon content, which is included in the carbon material, in the composite grain be 20 to 70%. If the graphitic skeletal carbon content is less than 20%, the electrical conductivity of the carbon material decreases, and high capacity is difficult to obtain. On the other hand, if toe graphitic skeletal carbon content is more than 70%, permeation of an electrolyte solution is difficult due to increased hydrophobicity, and high capacity is difficult to obtain in some cases.

It is preferable that the composite be a grain having a size of 1 μm or more and 20 μm or less and, as shown in FIG. 1, have a void(s) therein.

Thereby, excellent application performance is obtained without capacity decrease, namely, with high capacity. Because the grain size as large, even dispersion of the cathode material in an applied slurry is easy and the slurry's fluidity is excellent, so that spots by the application are hardly generated. Hence, the applied film shrinks, which occurs in the application process or a drying process, not much and evenly, and cracks are prevented from being generated. In particular, when an application amount thereof is large, the effect is strikingly demonstrated. If the grain size is less than 1 μm, the application performance is bad in some cases. On the odder hand, if the grain size is more than 20 μm, the surface of the applied film is rough, i.e. not uniform, caused by the grain in some cases. It is particularly preferable that the shape of the grain be spherical.

Herein, the grain size is a circle-equivalent diameter of the projected areas of grains observed with a transmission electron microscope (TEM) or a scanning electron microscope (SEM). The circle-equivalent diameter is calculated using a TEM image or an SEM image as follows; observed grains each are converted to the area of a circle, and the average value of the diameters of the circles is calculated. The circle-equivalent diameter is a number average value of 20 or more diameters thereof. In general, the circle-equivalent diameter is a number average value of 50 diameters thereof. When either a TEM image or an SEM image is within the scope of the present invention, the effect, of the present invention is obtained.

Further, it is preferable that a void(s) having a size of 200 nm or more and less than the grain diameter exist in the grain.

Existence of the void in the grain makes high capacity possible even under a high discharge rate. This is because the electrolyte solution permeates the grain and a sufficient amount thereof can be kept in the void, so that even under a high rate, $Li^+$ ions can be easily transferred between the grain and the electrolyte solution inside the grain. On the other hand, if no void exists, the electrolyte solution cannot permeate the grain well and a sufficient amount thereof cannot reach the inside of the grain, so that $Li^+$ ions need to diffuse to the surface of the grain through the inside of she solid. Hence, efficient $Li^+$ ion intercalation/deintercalation under a high rate is impossible in some cases. That is, high capacity under a high rate is unavailable in some cases.

It is preferable that the abundance of the void be 20% or more and 80% or less in terms of an area rate in the section of the grain. The reason why the area rate is 20% or more and 80% or less is that if the area rate is less than 20%, high capacity under a high discharge rate is unavailable in some cases, whereas if the area rate is more than 80%, high capacity under a high discharge rate is available, but increase of the active material content in an electrode is difficult in some cases.

The cathode material for lithium ion secondary batteries of the present invention may be a cathode layer containing at least a binder, and the cathode layer is provided on the surface of a metal foil which serves as a current collector so that a cathode member for Lithium ion secondary batteries is produced.

The binder (also referred to as a binding agent) serves to bind an active material and/or an electrically conductive auxiliary.

The binder, in the present invention is any of these generally used in producing cathodes of lithium, ion secondary batteries. It is preferable that the binder be chemically and electrochemically stable against an electrolyte of a lithium ion secondary battery and a solvent of the electrolyte.

The binder is either of thermoplastic resin and thermosetting resin. Examples thereof include: polyolefin such as polyethylene and polypropylene; fluorine-containing resins such as polytetrafluoroethylene (PTFE), polyvinylidene fluoride (PVDF), tetrafluoroethylene-hexafluoroethylene copolymer, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, and vinylidene fluoride-perfluoromethyl vinyl ether-tetrafluoroethylene copolymer; styrene butadiene rubber (SBR); ethylene-acrylic acid copolymer and $Na^+$ ion crosslinked product of the copolymer; ethylene-methacrylic acid copolymer and $Na^+$ ion crosslinked product of the copolymer; ethylene-methyl acrylate copolymer and $Na^+$ ion crosslinked product of the copolymer; ethylene-methyl methacrylate copolymer and $Na^+$ ion crosslinked product of the copolymer; and carboxymethyl cellulose. Some of these may be used in combination. Among these materials, PVDF and PTFE are particularly preferable.

The binder is generally used in such a way as to be 1 to 20 mass % or around in the total amount of the cathode.

The cathode layer of the cathode member for lithium ion secondary batteries may further contain the electrically conductive auxiliary.

Substantially, there is no special limitation on the electrically conductive auxiliary as long as it is an electron conductive material which is chemically stable. Examples thereof include carbon materials: such as graphites including natural graphite (flaky graphite, etc.) and synthetic graphite; acetylene black; Ketjen black; carbon blacks including channel black, furnace black, lamp black, and thermal black; and carbon fiber, and also include: electro-conductive fibers including metal fiber; carrion fluoride; metal powders of aluminum, etc.; zinc oxide; electro-conductive whiskers of potassium titanate, etc.; electro-conductive metal oxides including titanium oxide; and organic electro-conductive materials including polyphenylene derivative. One of these may be used alone, or two or more thereof may be used in combination. Among these, carbon materials such as acetylene black, Ketjen black, and carbon black are particularly preferable.

The electrically conductive auxiliary is generally need in such a way as so be 1 to 25 mass % or around in the total amount of the cathode.

The cathode layer contains at least the cathode active material and the binder and has a structure having a void(s) which an electrolyte solution can enter. The cathode layer may contain the electrically conductive auxiliary in addition to the cathode active material and the binder.

The metal foil is an electro-conductive metal foil, and a foil made of aluminum, aluminum alloy or the life may be used, therefor. The thickness thereof may be 5 μm to 50 μm.

The cathode member for lithium ion secondary batteries is used to produce a lithium ion secondary battery. For example, a lithium ion secondary battery is composed of at least an anode, a separator, and a non-aqueous electrolyte solution in addition to the cathode member for lithium ion secondary batteries.

The anode contains a binder (also referred to as a binding agent) as needed in sedition to an anode active material.

The anode active material of the anode is any material which allows metallic lithium or lithium ion doping/de-doping. Examples of the material which allows lithium ion doping/de-doping include carbon materials such as graphite, pyrolytic carbons, cokes, glassy carbons, sintered product of organic polymer compound, mesocarbon microbead, carbon fiber, and activated carbon. Also compounds including; alloys of Si, Sn, In, etc.; oxides of Si, Sn, Ti, etc. capable of charge/discharge at a low potential which is equivalent, to that of Li; and nitride of Li and Co such as $Li_{2.6}Co_{0.4}N$ are usable as the anode active material. Metal capable of being alloyed with Li, an oxide or the like may be substituted for a part of graphite.

When graphite is used as the anode active material, the voltage in full-charge can be assumed to be approximately 0.1 V with reference to Li, so that the potential of the cathode can be calculated, for convenience by adding 0.1 V to the battery voltage. Hence, graphite is preferable for easy control of the charging potential of the cathode.

The anode may be configured to nave an anode layer which contains the anode active material and the binder and is provided on the surface of a metal foil which serves as a current collector.

The metal foil is, for example, a foil of: a simple substance of copper, nickel or titanium; an alloy of any of these; or stainless steel. Preferably used materials for the anode current collector in the present invention include copper and an alloy thereof. Preferable metals capable of being alloyed with cooper, include Zn, Ni, Sn, and Al. A small amount of Fe, P, Pb, Mn, Ti, Cr, Si, As or the like may be added thereto.

The separator, is any insulating thin film having high ion permeability and a certain level of mechanical strength. Materials used for the separator include olefinic polymer, fluorine-containing polymer, cellulosic polymer, polymide, nylon, glass fiber, and alumina fiber. Forms used for the separator include non-woven fabric, woven fabric, and micro-porous film.

In particular, polypropylene, polyethylene, mixture of polypropylene and polyethylene, mixture of polypropylene and polytetrafluoroethylene (PTFE), and mixture of polyethylene and polytetrafluoroethylene (PTFE) are preferable materials therefor, and the macro-porous film is a preferable form therefor.

In particular, the micro-porous film having a pore diameter of 0.01 to 1 μm and a thickness of 5 to 50 μm is preferable. The micro-porous film may be a single film or may be a composite film composed of two or more layers having different properties, for example, in pore geometry, pore density and/or material. A composite film, configured by bonding a polyethylene film and a polypropylene film is an example thereof.

The non-aqueous electrolyte solution is generally composed of an electrolyte (supporting salt) and a non-aqueous solvent. The supporting salt mainly used for the lithium secondary battery is lithium salt.

Examples of the lithium salt usable in the present invention include $LiClO_4$, $LiBF_4$, $LiPF_6$, $LiCF_3CO_2$, $LiAsF_6$, $LiSbF_6$, $LiB_{10}Cl_{10}$, fluorosulfonate salt represented by $LiOSO_2C_nF_{2n+1}$ (n represents a positive integer of 6 or less), imide salt represented by $LiN(SO_2C_nF_{2n+1})(SO_2C_mF_{2m+1})$ (each of m and n independently represents a positive integer of 6 or less), methide salt represented by $LiC(SO_2C_pF_{2p+1})(SO_2C_qF_{2q+1})(SO_2C_rF_{2r+1})$ (each of p, q and r independently represents a positive integer of 6 or less), and Li salt such as lower aliphatic carboxylate lithium, $LiAlCl_4$, LiCl, LiBr, LiI, chloroborane lithium, and lithium tetraphenylborate. One of these may be used alone, or two or more thereof may be used in a mixed manner. Among them, $LiBF_4$ and/or $LiPF_6$ being dissolved is preferable.

It is preferable that the concentration of the supporting salt be 0.2 to 3 mol per liter of an electrolyte solution although not particularly limited.

Examples of the non-aqueous solvent include: aprotic organic solvents such as propylene carbonate, ethylene carbonate, butylene carbonate, chloroethylene carbonate, trifluoromethyl ethylene carbonate, difluoromethyl ethylene carbonate, monofluoromethyl ethylene carbonate, hexafluoromethyl acetate, trifluoromethyl acetate, dimethyl carbonate, diethyl carbonate, methylethyl carbonate, γ-butyrolactone, methyl formate, methyl acetate, 1,2-dimethoxyethane, tetrahydrofuran, 2-methyltetrahydrofuran, dimethylsulfoxide, 1,3-dioxolane, 2,2-bis(trifluoromethyl)-1,3-dioxolane, formamide, dimethyl formamide, dioxolane, dioxane, acetonitrile, nitromethane, ethyl monoglyme, phosphoric tries tea, boric triester, trimethoxymethane, dioxolane derivative, sulfolane, 3-methyl-2-oxazolidinone, 3-alkylsydnone (the alkyl creep is propyl group, isopropyl group, butyl, group, etc.), propylene carbonate derivative, tetrahydrofuran derivative, ethyl ether, and 1,3-propane sultone; and ionic liquid. One of these may be used alone, or two or more thereof may be used in a mired manner.

Among them, the carbonate-based solvents are preferable, and it is particularly preferable to use cyclic carbonate and acyclic carbonate in a mixed manner. As cyclic carbonate, ethylene carbonate and propylene carbonate are preferable. As acyclic carbonate, diethyl carbonate, dimethyl carbonate, and methylethyl carbonate are preferable. The ionic liquid is preferable from the viewpoint of wide electrochemical window and boat resistance.

It is preferable that the electrolyte solution contain $LiCF_3SO_3$, $LiClO_4$, $LiBF_4$ and/or $LiPF_6$ dissolved in an electrolyte solution prepared by appropriately mixing some of ethylene carbonate, propylene carbonate, 1,2-dimethoxyethane, dimethyl, carbonate, and diethyl carbonate.

In particular, it is preferable that the electrolyte solution contain $LiPF_6$ all and at least one salt selected from $LiCF_3SO_3$, $LiClO_4$, and $LiBF_4$ in a mixed solvent of at least one of propylene carbonate and ethylene carbonate and at least one of dimethyl carbonate and diethyl carbonate.

The amount of addition of the electrolyte solution to the battery is not particularly limited, and hence an appropriate amount thereof can be used according to the amount of the cathode material and/or the anode material, and to the size of the battery.

Besides the electrolyte solution, a solid electrolyte described below may be used. The solid electrolyte is classified into an inorganic solid electrolyte and an organic solid electrolyte.

Examples of the inorganic solid electrolyte include nitride, halide, and oxysalt of Li. Among them, effective are $Li_3N$, LiI, $Li_3NI_2$, $Li_3$—LiI—LiOH, $Li_4SiO_4$, $Li_4SiO_4$—LiI—LiOH, $_xLi_3PO_{4-(1-x)}Li_4SiO_4$, $Li_2SiS_3$, phosphorus sulfide compound and so forth.

Effective examples of the organic solid electrolyte include polyethylene oxide derivative, polymer containing such derivative; polypropylene oxide derivative, polymer containing such derivative; polymer containing ion dissociative group; mixture of polymer containing ion dissociative group and the above aprotic electrolyte solution; phosphoric ester polymer; and polymer matrix material impregnated with an aprotic polar solvent. Polyacrylonitrile may be added to an electrolyte solution. It is also known, to use the inorganic and organic solid electrolytes in combination.

A lithium ion secondary battery can be produced using the material for lithium ion secondary batteries without producing the member for lithium ion secondary batteries. For example, a lithium ion secondary battery is composed of: a cathode configured by forming, on a metal mesh, a cathode layer which contains the material for lithium ion secondary batteries, an electrically conductive auxiliary, and a binder; an anode; a separator; and a non-aqueous electrolyte solution.

The cathode material for lithium ion secondary batteries of the present invention car be produced, for example, by the following methods.

The oxide in the present invention may be produced, by any method such as a dry method and a wet method as long as the method can synthesize an oxide. Examples thereof include a solid phase method (a solid phase reaction method), a hydrothermal method, (a hydrothermal synthesis method), a coprecipitation method, a sol-gel method, a vapor phase synthetic method (a Physical Vapor Deposition (PVD) method and a Chemical Vapor Deposition (CVD) method), a spray pyrolysis method, a flame method, and a roasting method.

In the following, production thereof using the solid phase method, the spray pyrolysis method, and the roasting method is described as examples.

A source material(s) used in the solid phase method is a compound(s) which contains elements composing the above-mentioned oxide, the compounds being, for example, oxide, carbonate, and/or organic salt such as acetate and oxalate. The compounds are weighed in accordance with a composition ratio and mixed with one another. For the mixing, a wet mixing method, a dry mixing method or the like is used. The obtained mixture is fired to synthesize the oxide. The oxide powder obtained by the firing is grounded, as needed. If there is any unreacted substance, further firing may be performed after the grinding.

As a specific case, in the case of $Li_{2.0625}Mn(Si_{0.9375}Al_{0.0625})O_4$, for example, manganese dioxide, lithium carbonate, silicon dioxide, and aluminum oxide are weighed in such a way as to be the above chemical composition and mixed. The mixed powder is fired at 700 to 900° C. for 5 to 20 hours in a reductive atmosphere. Thus, $Li_{2.0625}Mn(Si_{0.9375}Al_{0.0625})O_4$ can be produced.

As another specific case, in the case of $Li_{2.0625}Fe(Si_{0.9375}Al_{0.0625})O_4$, for example, lithium carbonate, iron (II) oxalate dihydrate, silicon dioxide, and aluminum oxide are weighed in such a way as be the above chemical composition and mixed. The mixed powder is tired at 700 to 900° C. for 5 to 20 hours in a reductive atmosphere. Thus, $Li_{2.0625}Fe(Si_{0.9375}Al_{0.0625})O_4$ can be produced.

A source material(s) used in the spray pyrolysis method is a compound(s) which contains elements composing a desired oxide and is soluble in water or an organic solvent. The solution in which the compound is dissolved is converted into liquid droplets using an ultrasonic wave or a nozzle (a one fluid nozzle, a two fluid nozzle, a four fluid nozzle, etc.), Then, the liquid droplets are introduced into a heating furnace of 400 to 1200° C. to be pyrolyzed. Thus, the oxide can be produced. Further heat treatment, and/or grinding are performed as needed. The oxide containing a carbon material can be produced by adding an organic compound to the scarce material solution.

As a specific case, in the case of $Li_{2.03125}Mn(Si_{0.96875}Al_{0.03125})O_4$, for example, lithium nitrate, manganese (II) nitrate hexahydrate, colloidal silica, and aluminum nitrate are weighted m such a way as to be the above chemical composition and dissolved in water. Here, an organic compound may be added to the solution. Examples of the organic compound include ascorbic acid, monosaccharides (glucose, fructose, galactose, etc.), disaccharides (sucrose, maltose, lactose, etc.), polysaccharides (amylose, cellulose, dextrin, etc.), polyvinyl alcohol, polyethylene glycol, polypropylene glycol, polyvinyl butyral, polyvinyl pyrrolidone, phenol, hydroquinone, catechol, maleic acid, citric acid, malonic acid, ethylene glycol, triethylene glycol, diethylene glycol butyl methyl ether, triethylene glycol butyl methyl ether, tetraethylene glycol dimethyl ether, tripropylene glycol dimethyl ether, and glycerin. For example, the solution in which the compounds are dissolved is converted into liquid droplets using an ultrasonic atomizer, and the liquid droplets are introduced together with nitrogen as a carrier gas into a heating furnace of 500 to 1000° C. to be pyrolyzed. Thus, $Li_{2.3125}Mn(Si_{0.96875}Al_{0.03125})O_4$ can be produced.

As another specific case, in the case of $Li_{2.03125}Fe(Si_{0.96875}Al_{0.03125})O_4$, for example, lithium nitrate, iron (III) nitrate nonahydrate, tetraethoxysilane, and aluminum sec-butoxide are weighted in such a way as to be the above chemical composition and dissolved in water. Tetraethoxysilane and aluminum sec-butoxide are dissolved in methoxyethanol in advance, and this solution is dissolved in the water. For example, the solution in which the compounds are dissolved is converted into liquid droplets using an ultrasonic atomiser, and the liquid droplets are introduced together with nitrogen as a carrier gas into a heating furnace of 500 to 1000° C. to be pyrolyzed. Thus, $Li_{2.03125}Fe(Si_{0.96875}Al_{0.03125})O_4$ can be produced.

Next, the production method as rag the recasting seethed is described as an example.

A source material(s) used in the roasting method is a compound(s) which contains elements composing a desired oxide and is soluble in water. When the oxide contains iron as an element, it as preferable to use for the scarce material an iron and steel pickling waste liquid or an aqueous solution prepared by dissolving a rolling scale in hydrochloric acid. The aqueous solution in which the compound is dissolved is introduced into a roasting furnace of the Ruthner type, Lurgi type, Chemirite type or the like to be pyrolyzed. Thus, the oxide can be produced. Further heat treatment and/or grinding are performed as needed. The oxide containing a carbon material can be produced by adding an organic compound to she source material solution.

As a specific case, in the case of $Li_{2.0625}Fe(Si_{0.9375}Al_{0.0625})O_4$, for example, lithium, acetate, manganese (II) nitrate hexahydrate, colloidal silica, and aluminum nitrate are weighted in such a way as to me the above chemical composition and dissolved in water. Glucose is dissolved in the aqueous solution in which the compounds are dissolved, and the resulting solution is, for example, introduced into a Chemirite type roasting furnace to be pyrolyzed at 500 to 1000° C. Thus, $Li_{2.0625}Fe(Si_{0.9375}Al_{0.0625})O_4$ can be produced. Further, the ground grain(s) obtained by vest grinding in a bead mill may be subjected to heat treatment in an inert atmosphere.

As another specific case, in the case of $Li_{2.0625}Fe(Si_{0.9375}Al_{0.0625})O_4$, for example, lithium carbonate, colloidal silica, and aluminum (III) chloride hexahydrate are dissolved in an iron and steel pickling waste liquid (for example, hydrochloric acid waste liquid with a concentration of 3.0 mol (Fe)/L) to be prepared in such a way as to be a concentration equivalent so the above chemical composition ratio. In order to fully dissolve lithium carbonate, an appropriate amount of 18% hydrochloric acid is added to the iron and steel pickling waste liquid in advance. Glucose is dissolved in the aqueous solution in which the compounds are dissolved, and the resulting solution is, for example, introduced into a Ruthner type roasting furnace to be pyrolyzed at 500 to 1000° C. Thus, $Li_{2.0625}Fe(Si_{0.9375}Al_{0.0625})O_4$ can be produced. Further, the ground grain(s) obtained by wet grinding in a bead mill may be subjected to heat treatment in an inert atmosphere.

Examples of the organic compound, which produces the carbon material, include ascorbic acid, monosaccharides (glucose, fructose, galactose, etc), disaccharides (sucrose, maltose, lactose, etc), polysaccharides (amylose, cellulose, dextrin, etc), polyvinyl alcohol, polyethylene glycol, polypropylene glycol, polyvinyl butyral, polyvinyl pyrrolidone, phenol, hydroquinone, catechol, maleic acid, citric acid, malonic acid, ethylene glycol, triethylene glycol, diethylene glycol butyl, methyl ether, triethylene glycol butyl methyl ether, tetraethylene glycol dimethyl ether, tripropylene glycol dimethyl ether, and glycerin.

Examples of the compound, which contains elements composing the metal oxide, include metal, hydroxide, nitrate, chloride, organic acid salt, oxide, carbonate, and metal alkoxide.

EXAMPLES

First Example

Starting materials used were lithium nitrate ($LiNO_3$), iron (III) nitrate nonahydrate ($Fe(NO_3)_3.9H_2O$), tetraethoxysilane (hereinafter TEOS), aluminum sec-butoxide, magnesium nitrate hexahydrate ($Mg(NO_3)_2.6H_2O$), boric acid ($H_3BO_3$), gallium nitrate ($Ga(NO_3)_3.nH_2O$), yttrium isopropoxide, and sodium nitrate ($NaNO_3$). The materials were dissolved in water in such a way as to be each composition ratio shown in Table 1-1, so that aqueous solutions were prepared.

TEOS was dissolved in methoxyethanol in advance, and this solution was dissolved in the water. When aluminum sec-butoxide or yttrium isopropoxide was used, aluminum sec-butoxide or yttrium isopropoxide chemically modified with ethyl acetoacetate was added to the methoxyethanol, in which TEOS was dissolved, to be dissolved therein, and the resulting solution was dissolved in the water. Further, glucose as the organic compound, which produces a carbon material, was added to the aqueous solutions. Each of these aqueous solutions except for those for Samples 1-20, 1-21, and 1-26 was subjected to spray pyrolysis in a heating furnace heated at 800° C. using a carrier gas composed of nitrogen gas. Thereby, samples were produced. For Sample 1-20, the aqueous solution was sprayed in the heating furnace of 500° C. For Sample 1-21, the aqueous solution was sprayed in the heating furnace of 400° C.

Samples 1-1 to 1-17 were further subjected to wet grinding and then heat treatment at 500° C. for 10 hours in 1% $H_2$/Ar. Sample 1-18 was further subjected to wet grinding and then heat treatment at 600° C. for 3 hours in 1% $H_2$/Ar. Sample 1-19 was further subjected to wet grinding a ad then heat treatment at 300° C. for 5 hours in 1% $H_2$/Ar. Samples 1-20 to 1-25 were not subjected to wet grinding or heat treatment. Sample 1-26 was produced, by subjecting Sample 1-22 to grinding and then granulation.

The solutions each were prepared in such a way that the concentration of metal ions in the solution was within a range of 0.1 to 0.35 mol/L when the composition of the oxide was converted to moles. The glucose was added in such a way that a mole ratio of glucose/oxide was within a range of 2 to 2.4. Each sample produced without grinding was a spherical grain(s), and the spherical grain size was controlled through the concentration of metal, ions in the liquid droplets and the glucose content.

The concentration of metal sons in the solution and the added amount of glucose regarding each sample are shown in Table 1-1.

<Analysis of Individual Samples>

The individual samples obtained as described above were analyzed as follows.

Phase check was performed using a powder X-ray diffractometer (Ultima II manufactured by Rigaku Corporation). Because Samples 1-1 to 1-19 were subjected to the heat treatment, they had a diffraction pattern similar to that of a $Li_2FeSiO_4$ crystal phase. However, in the samples which were Li excessive or element-substituted, diffraction peak shift was observed. Samples 1-20 and 1-22 to 1-26 had no diffraction peak within $2\theta=15$ to 18° but had a broad diffraction peak within $2\theta=33\pm2°$ with Cu—K$\alpha$ line and hence were crystalline. Sample 1-21 had no diffraction peak at all and hence was amorphous.

Samples 1-1 to 1-26 were observed under a transmission electron microscope (H-9000UHR III manufactured by Hitachi Ltd.). All of the samples were composites having the sea-islands structure. The circle-equivalent diameter of the islands (oxide) was calculated using the method described above. The obtained circle-equivalent diameter of each sample is shown in Table 1-2.

The grains of Samples 1-20 to 1-26 were observed under a scanning electron microscope (JSM-7000F manufactured by JEOL Ltd.), and the circle-equivalent diameter was calculated as the spherical grain size using the images. The values are shown in the "Grain Size" column in Table 1-2. Each of Samples 1-1 to 1-19 was grounded to be a size of 0.1 μm, so that each of Samples 1-1 to 1-19 was a nonuniformity-shaped fine grain(s) having the mentioned size, not a spherical grain(s). Sample 1-26 was produced by grinding Sample 1-22 and then granulating, so that the size thereof was the size of a spherically-granulated grain(s). The grains were observable under a transmission electron microscope too. The obtained values of the grain size under a transmission electron microscope were the same as those shown therein.

Sections of Samples 1-20 to 1-26, which were the grains, were also observed under a scanning electron microscope. Using the images, a void(s) of 200 nm or more in the grains was picked, and the area rate was calculated as the abundance of the void. Samples 1-20 to 1-25 had the values shown in the "Area Rate" column of the "Void in Grain" column in Table 1-2. Sample 1-26 was produced by grinding Sample 1-22 and then granulating, so that the inside of the grain was dense, and no large void such as a void of 200 nm or more existed.

The carbon material content in each sample was determined using a carbon/sulfur analyzer EMIA-320V manufactured by Horiba Ltd. and is shown in Table 1-2.

<Evaluation of Battery Characteristics>

Battery characteristics of each sample were evaluated as follows.

First, a sample, acetylene black powder, and polytetrafluoroethylene powder were mixed in a weight ratio of 70:25:5 in a mortar, and the mixture was compressed onto a titanium mesh. Thereby, cathodes were produced.

For anodes, metallic lithium foils were used, and for anode current collectors, 20 μm thick nickel foils were used.

As each of electrolyte solutions, a non-aqueous electrolyte solution composed of 1.0 mol/L $LiPF_6$ dissolved in a mixed solvent of ethyl carbonate and dimethyl carbonate mixed in a volume ratio of 1:2 was used, and as each of separators, 25 μm thick porous polypropylene was used. CR2032 type coin batteries were assembled in an argon-filled glove box by using these.

Five coin batteries were produced using each sample, and the produced coin batteries were subjected to a charge/discharge test in a thermostat chamber at 25° C. to measure the initial charge/discharge capacity. In the initial charge/discharge test, preliminary charge-and-discharge was repeated four times under a CC-CV condition over a voltage range of 1.5 to 5.0 V at a rate of 0.1 C, and thereafter charge was performed under the CC-CV condition at a rate of 0.1 C to 1.5 Li, and the discharge capacity was measured to obtain the initial charge/discharge capacity. The initial charge/discharge capacity of the five coin batteries of each sample was measured. The average value of the obtained values of the initial charge/discharge capacity of three coin batteries without those having the maximum value and the minimum value is shown in the "Initial Charge/Discharge Capacity" column in Table 1-2.

Regarding the internal resistance reduction effect, a voltage at 100 mAh/g was found from the discharge curve from which the initial discharge capacity was found. It was determined that the internal resistance was reduced when the voltage was high. The voltage of the five coin batteries of each sample was found from the discharge curve. The average value of the obtained values of the voltage of three coin batteries without those having the maximum value and the minimum value is shown in Table 1-2.

In addition, charge-and-discharge was repeated 25 cycles, and a slope of voltage change (voltage change per cycle) at 100 mAh/g in the discharge curve from the $20^{th}$ cycle to the $25^{th}$ cycle was found, and the obtained value regarding each sample is shown in Table 1-2 as stability of the internal resistance reduction effect.

As shown in Tables 1-1 and 1-2, the voltage at 100 mAh/g of Samples 1-2, 1-4 to 1-11, 1-13 to 1-20, and 1-22 to 1-26 having more than 0 as the value of x was higher than that of Samples 1-1 and 1-3 having 0 as the value of x, and Samples 1-2, 1-4 to 1-11, 1-13 to 1-20, and 1-22 to 1-26 showed the internal resistance reduction effect. Sample 1-12 had more than 0.25 as the value of x and did not show the internal resistance reduction effect. In Sample 1-21, not enough oxide was formed, so that charge/discharge was hardly performed.

Tables 1-1 and 1-2 show the result of compositions in which Al was used for electric-charge compensation in the case where the value of x was a multiple of 0.03125 and the case where the value of x was not a multiple of 0.03125. It is shown therein that when the value of x is a multiple of 0.03125, stability of the internal resistance reduction effect is excellent. The result shows that even when the element used for electric-charge compensation is other than Al, the same tendency is observed.

The application performance was evaluated regarding Samples 1-20 to 1-26.

Into a dispersion medium (N-methylpyrrolidone, i.e. NMP), 90 mass % of a sample, 4 mass % of polyvinylidene difluoride (PVDF), and 6 mass % of acetylene black were mixed to prepare a slurry. The slurry was applied onto a 20 μm thick aluminum foil using a Baker-type applicator in which a clearance was set at 300 μm and dried using a dryer of 100° C. The surface of the dried applied film was visually observed. Samples having conspicuous surface roughness or a crack(s) were evaluated as "bad application performance", and samples having flat surface and no crack were evaluated as "excellent application performance".

Samples 1-20 to 1-22 and 1-24 to 1-26 were evaluated as "excellent application performance". Sample 1-23 was a sub-micron grain(s) and accordingly evaluated as "bad application performance".

The samples each having an appropriate amount of the void in the grain showed excellent discharge capacity even under a high rate.

TABLE 1-1

| | $Li_{2+x}(Co_{1-y}M^A_y)(Si_{1-z}M^B_z)O_4$ | | | | | TEMPERATURE OF SPRAY FURNACE | ADDED AMOUNT OF GLUCOSE MOLE RATIO | CONCENTRATION OF METAL ION | GRINDING AND |
|---|---|---|---|---|---|---|---|---|---|
| No. | x | $M^A$ | y | $M^B$ | z | [° C.] | (GLUCOSE/OXIDE) | OXIDE mol/L | HEAT TREATMENT |
| 1-1 | 0 | — | 0 | — | 0 | 800 | 2 | 0.35 | GRINDING AND HEAT TREATMENT AT 500° C. FOR 10 h |
| 1-2 | 0.0625 | — | 0 | Al | 0.0625 | 800 | 2 | 0.35 | GRINDING AND HEAT TREATMENT AT 500° C. FOR 10 h |
| 1-3 | 0 | Fe(III) | 0.0625 | Al | 0.0625 | 800 | 2 | 0.35 | GRINDING AND HEAT TREATMENT AT 500° C. FOR 10 h |
| 1-4 | 0.0625 | — | 0 | B | 0.0625 | 800 | 2 | 0.35 | GRINDING AND HEAT TREATMENT AT 500° C. FOR 10 h |
| 1-5 | 0.0625 | — | 0 | Ga | 0.0625 | 800 | 2 | 0.35 | GRINDING AND HEAT TREATMENT AT 500° C. FOR 10 h |
| 1-6 | 0.0625 | — | 0 | Y | 0.0625 | 800 | 2 | 0.35 | GRINDING AND HEAT TREATMENT AT 500° C. FOR 10 h |
| 1-7 | 0.0625 | — | 0 | Mg | 0.03125 | 800 | 2 | 0.35 | GRINDING AND HEAT TREATMENT AT 500° C. FOR 10 h |
| 1-8 | 0.0625 | — | 0 | Na | 0.02083 | 800 | 2 | 0.35 | GRINDING AND HEAT TREATMENT AT 500° C. FOR 10 h |

TABLE 1-1-continued

| | $Li_{2+x}(Co_{1-y}M^A_y)(Si_{1-z}M^B_z)O_4$ | | | | TEMPERATURE OF SPRAY FURNACE | ADDED AMOUNT OF GLUCOSE MOLE RATIO | CONCENTRATION OF METAL ION | GRINDING AND |
|---|---|---|---|---|---|---|---|---|
| No. | x | $M^A$ | y | $M^B$ z | [° C.] | (GLUCOSE/OXIDE) | OXIDE mol/L | HEAT TREATMENT |
| 1-9 | 0.0625 | Li | 0.0625 | — 0 | 800 | 2 | 0.35 | GRINDING AND HEAT TREATMENT AT 500° C. FOR 10 h |
| 1-10 | 0.0625 | Na | 0.0625 | — 0 | 800 | 2 | 0.35 | GRINDING AND HEAT TREATMENT AT 500° C. FOR 10 h |
| 1-11 | 0.0625 | Li | 0.00125 | Al 0.03125 | 800 | 2 | 0.35 | GRINDING AND HEAT TREATMENT AT 500° C. FOR 10 h |
| 1-12 | 0.26 | — | 0 | Al 0.26 | 800 | 2 | 0.35 | GRINDING AND HEAT TREATMENT AT 500° C. FOR 10 h |
| 1-13 | 0.25 | — | 0 | Al 0.25 | 800 | 2 | 0.35 | GRINDING AND HEAT TREATMENT AT 500° C. FOR 10 h |
| 1-14 | 0.2 | — | 0 | Al 0.2 | 800 | 2 | 0.35 | GRINDING AND HEAT TREATMENT AT 500° C. FOR 10 h |
| 1-15 | 0.125 | — | 0 | Al 0.125 | 800 | 2 | 0.35 | GRINDING AND HEAT TREATMENT AT 500° C. FOR 10 h |
| 1-16 | 0.125 | — | 0 | Al 0.1125 | 800 | 2 | 0.35 | GRINDING AND HEAT TREATMENT AT 500° C. FOR 10 h |
| 1-17 | 0.02 | — | 0 | Al 0.02 | 800 | 2 | 0.35 | GRINDING AND HEAT TREATMENT AT 500° C. FOR 10 h |
| 1-18 | 0.0625 | — | 0 | Al 0.0625 | 800 | 2 | 0.35 | GRINDING AND HEAT TREATMENT AT 500° C. FOR 5 h |
| 1-19 | 0.0625 | — | 0 | Al 0.0625 | 800 | 2 | 0.35 | GRINDING AND HEAT TREATMENT AT 500° C. FOR 5 h |
| 1-20 | 0.0625 | — | 0 | Al 0.0625 | 800 | 2 | 0.35 | NO GRINDING OR HEAT TREATMENT |
| 1-21 | 0.0625 | — | 0 | Al 0.0625 | 800 | 2 | 0.35 | NO GRINDING OR HEAT TREATMENT |
| 1-22 | 0.0625 | — | 0 | Al 0.0625 | 800 | 2 | 0.35 | NO GRINDING OR HEAT TREATMENT |
| 1-23 | 0.0625 | — | 0 | Al 0.0625 | 800 | 2 | 0.1 | NO GRINDING OR HEAT TREATMENT |
| 1-24 | 0.0625 | — | 0 | Al 0.0625 | 800 | 2.2 | 0.3 | NO GRINDING OR HEAT TREATMENT |
| 1-25 | 0.0625 | — | 0 | Al 0.0625 | 800 | 2.4 | 0.35 | NO GRINDING OR HEAT TREATMENT |
| 1-26 | 0.0625 | — | 0 | Al 0.0625 | GRIND 1-22 AND GRANULATE | 2 | 0.35 | — |

TABLE 1-2

| No. | CARBON CONTENT [mol %] | CIRCLE EQUIVALENT DIAMETER OF OXIDE IN CONTENTS [nm] | GRADE SIZE [μm] | VOID IN GRAIN (200 nm OR MORE) PRESENCE | VOID IN GRAIN (200 nm OR MORE) AREA RATE(%) | INTERNAL RESISTANCE REDUCTION EFFECT (VOLTAGE AT 100 mAH/g) [V] |
|---|---|---|---|---|---|---|
| 1-1 | 10 | 12 | — | — | — | 2.15 |
| 1-2 | 10 | 12 | — | — | — | 2.45 |
| 1-3 | 10 | 12 | — | — | — | 2.45 |
| 1-4 | 10 | 12 | — | — | — | 2.45 |
| 1-5 | 10 | 12 | — | — | — | 2.40 |
| 1-6 | 10 | 12 | — | — | — | 2.40 |
| 1-7 | 10 | 12 | — | — | — | 2.40 |
| 1-8 | 10 | 12 | — | — | — | 2.40 |
| 1-9 | 10 | 12 | — | — | — | 2.35 |
| 1-10 | 10 | 12 | — | — | — | 2.33 |
| 1-11 | 10 | 12 | — | — | — | 2.35 |
| 1-12 | 10 | 12 | — | — | — | 2.33 |
| 1-13 | 10 | 12 | — | — | — | 2.35 |
| 1-14 | 10 | 12 | — | — | — | 2.35 |
| 1-15 | 10 | 12 | — | — | — | 2.45 |

TABLE 1-2-continued

| | | | | | | |
|---|---|---|---|---|---|---|
| 1-16 | 10 | 12 | — | — | — | 2.40 |
| 1-17 | 10 | 12 | — | — | — | 2.40 |
| 1-18 | 10 | 15 | — | — | — | 2.45 |
| 1-19 | 10 | 17 | — | — | — | 2.35 |
| 1-20 | 13 | 3 | 5 | YES | 43 | 2.45 |
| 1-21 | 12 | 2(AMORPHOUS) | 6 | YES | 35 | — |
| 1-22 | 10 | 6 | 5 | YES | 46 | 2.45 |
| 1-23 | 7 | 6 | 0.8 | YES | 20 | 2.40 |
| 1-24 | 9 | 6 | 5 | YES | 80 | 2.45 |
| 1-25 | 9 | 6 | 5 | YES | 90 | 2.45 |
| 1-26 | 10 | 6 | 20 | NO | — | 2.45 |

| No. | INITIAL DISCHARGE CAPACITY [mAh/g] | STABILITY OF INTERNAL RESISTANCE REDUCTION EFFECT [V/cycle] | REMARK |
|---|---|---|---|
| 1-1 | 250 | 4.05 | COMPARATIVE EXAMPLE |
| 1-2 | 250 | 4.05 | EXAMPLE |
| 1-3 | 250 | 4.05 | COMPARATIVE EXAMPLE |
| 1-4 | 250 | 4.05 | EXAMPLE |
| 1-5 | 250 | 4.05 | EXAMPLE |
| 1-6 | 250 | 4.05 | EXAMPLE |
| 1-7 | 250 | 4.05 | EXAMPLE |
| 1-8 | 250 | 4.05 | EXAMPLE |
| 1-9 | 250 | 4.05 | EXAMPLE |
| 1-10 | 250 | 4.05 | EXAMPLE |
| 1-11 | 250 | 4.05 | EXAMPLE |
| 1-12 | 250 | 4.05 | COMPARATIVE EXAMPLE |
| 1-13 | 250 | 4.05 | EXAMPLE |
| 1-14 | 250 | 4.05 | EXAMPLE |
| 1-15 | 250 | 4.05 | EXAMPLE |
| 1-16 | 250 | 4.05 | EXAMPLE |
| 1-17 | 250 | 4.05 | EXAMPLE |
| 1-18 | 250 | 4.05 | EXAMPLE |
| 1-19 | 250 | 4.05 | EXAMPLE |
| 1-20 | 250 | 4.05 | EXAMPLE |
| 1-21 | 20 | — | COMPARATIVE EXAMPLE |
| 1-22 | 250 | 4.05 | EXAMPLE |
| 1-23 | 250 | 4.05 | EXAMPLE |
| 1-24 | 250 | 4.05 | EXAMPLE |
| 1-25 | 250 | 4.05 | EXAMPLE |
| 1-26 | 250 | 4.05 | EXAMPLE |

Second Example

Starting materials used were lithium nitrate ($LiNO_3$), manganese (II) nitrate hexahydrate ($Mn(NO_3)_2 \cdot 6H_2O$), colloidal silica, aluminum nitrate nonahydrate ($Al(NO_3)_3 \cdot 9H_2O$), magnesium nitrate hexahydrate ($Mg(NO_3)_2 \cdot 6H_2O$), boric acid ($H_3BO_3$), gallium nitrate ($Ga(NO_3)_3 \cdot nH_2O$), yttrium nitrate hexahydrate ($Y(NO_3)_3 \cdot 6H_2O$), and sodium, nitrate ($NaNO_3$). The materials were dissolved in water in such a way as to be each composition ratio shown in Table 2-1, so that aqueous solutions were prepared. Further, glucose as the organic compound, which produces a carbon material, was added to the aqueous solutions. Each of these aqueous solutions except for that for Sample 2-21 was subjected to spray pyrolysis in a heating furnace heated at 600° C. using a carrier gas composed of nitrogen gas. Thereby, samples were produced.

Samples 2-1 to 2-11 were further subjected to wet grinding and then heat treatment at 700° C. for 5 hours in 1% $H_2$/Ar. Sample 2-18 was further subjected to act grinding and then heat treatment at 800° C. for 5 hours in 1% $H_2$/Ar. Sample 2-19 was further subjected to wet grinding and then neat treatment at 950° C. for 3 hours in 1% $H_2$/Ar. Samples 2-20 was not subjected to wet grinding or heat treatment. Sample 2-21 was produced by subjecting Sample 2-20 to grinding and then granulation.

The solutions each were prepared in such a way that the concentration of metal, ions in the solution was 0.35 mol/L when the composition of the oxide was converted to soles.

The glucose was added in each a way that a mole ratio of glucose/oxide was 2. The sample produced without grinding was a spherical grain(s).

<Analysis of Individual Samples>

The individual Samples 2-1 to 2-21 obtained as described above were analyzed in the same manner as that of the first example.

Samples 2-1 to 2-21 were subjected to X-ray diffraction. Because Samples 2-1 to 2-10 were subjected to the heat treatment, they had a diffraction pattern similar to that of a $Li_2MnSiO_4$ crystal phase. However, in the samples which were Li excessive or element-substituted, diffraction peak shift was observed. Samples 2-20 and 2-21 had no diffraction peak within $2\theta=15$ to $18°$ but had a broad diffraction peak within $2\theta=33\pm2°$ C. with Cu—Kα line and hence were crystalline.

According to observation under a TEM, ail of Samples 2-1 to 2-21 were composites having the sea-islands structure. The circle-equivalent diameter of the islands (oxide) was calculated using the method described above. The obtained circle-equivalent diameter of each sample is shown is Table 2-2.

The spherical grains of Samples 2-20 to 2-21 were observed under an SEM, and the circle-equivalent diameter was calculated as the grain size using the images. The values are shown in the "Grain Size" column in Table 2-2. Each of Samples 2-1 to 2-19 was grounded to be a size of 0.1 μm, so that each of Samples 2-1 to 2-19 was a nonuniformity-shaped fine grain(s) hawing the mentioned size, not a spherical grain(s), Sample 2-21 was produced by grinding Sample 2-20 and then granulating, so that the size thereof was the size of a spherically-granulated grain(s).

Sections of Samples 2-20 to 2-21, which were the grains, were also observed under an SEM. Using the images, a void(s) of 200 nm or more in the grains was picked, and the area rate was calculated as the abundance of the void. Sample 2-20 had the value shown in the "Area Rate" column of the "Void in Grain" column in Table 2-2, Sample 2-21 was produced by grinding Sample 2-20 and then granulating, so that the inside of the grain was dense, and no large void such as a void of 200 nm or more existed.

<Evaluation of Battery Characteristics>

Battery characteristics were evaluated, in the same manner as that of the first example except for the following point.

In the initial charge/discharge test, preliminary charge-and-discharge was performed, one time under a CC-CV condition over a voltage range of 1.0 to 5.0 V at a rate of 0.1 C, and thereafter charge was performed under the CC-CV condition at a rate of 0.1 C to 220 mAh/g, and the discharge capacity was measured to obtain the initial charge/discharge capacity.

Regarding the internal resistance reduction effect, a voltage at 140 mAh/g was found from the discharge curve from which the initial discharge capacity was found. It was determined that the internal resistance was reduced when the voltage was high. In addition, charge-and-discharge was repeated 10 cycles, and a slope of voltage change (voltage change per cycle) at 140 mAh/g in the discharge curve from the $5^{th}$ cycle to the $10^{th}$ cycle was found as stability of the internal resistance reduction effect.

As shown in Tables 2-1 and 2-2, the voltage at 140 mAh/g of Samples 2-3 to 2-8 and 2-10 to 2-21 having more than 0 as the value of x was higher than that of Samples 2-1 and 2-2 having 0 as the value of x, and Samples 2-3 to 2-0 and 2-10 to 2-21 showed the internal resistance reduction effect. Sample 2-9 had more than 0.25 as the value of e and did not show the internal resistance reduction effect.

Tables 2-1 and 2-2 show the result of compositions in which Al was used for electric-charge compensation in the case where the value of x was a multiple of 0.03125 and the case where the value of x was not a multiple of 0.03125. It is shown therein that when the value of x is a multiple of 0.03123, stability of the internal resistance reduction effect is excellent. The result shows that, even when the element used for electric-charge compensation is other than Al, the same tendency is observed.

The application performance was evaluated regarding Samples 2-20 to 2-21. They were evaluated as "excellent application performance". The samples each having an appropriate amount of the void in the grain showed excellent discharge capacity even under a high rate.

TABLE 2-1

| No. | $Li_{2+x}(Co_{1-y}M^A_y)(Si_{1-z}M^B_z)O_4$ | | | | TEMPERATURE OF SPRAY FURNACE [°C.] | ADDED AMOUNT OF GLUCOSE MOLE RATIO (GLUCOSE/OXIDE) | CONCENTRATION OF METAL ION OXIDE mol/L | GRINDING AND HEAT TREATMENT |
|---|---|---|---|---|---|---|---|---|
| | x | $M^A$ | y | $M^B$ z | | | | |
| 2-1 | 0 | — | 0 | — 0 | 600 | 2 | 0.35 | GRINDING AND HEAT TREATMENT AT 100° C. FOR 5 h |
| 2-2 | 0 | Mn(III) | 0.125 | Al 0.125 | 600 | 2 | 0.35 | GRINDING AND HEAT TREATMENT AT 100° C. FOR 5 h |
| 2-3 | 0.125 | — | 0 | Al 0.125 | 600 | 2 | 0.35 | GRINDING AND HEAT TREATMENT AT 100° C. FOR 5 h |
| 2-4 | 0.025 | — | 0 | Al 0.125 | 600 | 2 | 0.35 | GRINDING AND HEAT TREATMENT AT 100° C. FOR 5 h |
| 2-5 | 0.03125 | — | 0 | Al 0.03125 | 600 | 2 | 0.35 | GRINDING AND HEAT TREATMENT AT 100° C. FOR 5 h |
| 2-6 | 0.09375 | — | 0 | Al 0.09375 | 600 | 2 | 0.35 | GRINDING AND HEAT TREATMENT AT 100° C. FOR 5 h |
| 2-7 | 0.1 | — | 0 | Al 0.1 | 600 | 2 | 0.35 | GRINDING AND HEAT TREATMENT AT 100° C. FOR 5 h |
| 2-8 | 0.29 | — | 0 | Al 0.25 | 600 | 2 | 0.35 | GRINDING AND HEAT TREATMENT AT 100° C. FOR 5 h |
| 2-9 | 0.3 | — | 0 | Al 0.3 | 600 | 2 | 0.35 | GRINDING AND HEAT TREATMENT AT 100° C. FOR 5 h |
| 2-10 | 0.09375 | — | 0 | B 0.09375 | 600 | 2 | 0.35 | GRINDING AND HEAT TREATMENT AT 100° C. FOR 5 h |
| 2-11 | 0.09375 | — | 0 | Ga 0.09375 | 600 | 2 | 0.35 | GRINDING AND HEAT TREATMENT AT 100° C. FOR 5 h |
| 2-12 | 0.09375 | — | 0 | Y 0.09375 | 600 | 2 | 0.35 | GRINDING AND HEAT TREATMENT AT 100° C. FOR 5 h |
| 2-13 | 0.09375 | — | 0 | Mg 0.09375 | 600 | 2 | 0.35 | GRINDING AND HEAT TREATMENT AT 100° C. FOR 5 h |

TABLE 2-1-continued

| No. | Li$_{2+x}$(Co$_{1-y}$M$^A_y$)(Si$_{1-z}$M$^B_z$)O$_4$ | | | | | TEMPERATURE OF SPRAY FURNACE [°C.] | ADDED AMOUNT OF GLUCOSE MOLE RATIO (GLUCOSE/OXIDE) | CONCENTRATION OF METAL ION OXIDE mol/L | GRINDING AND HEAT TREATMENT |
|---|---|---|---|---|---|---|---|---|---|
| | x | M$^A$ | y | M$^B$ | z | | | | |
| 2-14 | 0.09375 | — | 0 | Na | 0.09375 | 600 | 2 | 0.35 | GRINDING AND HEAT TREATMENT AT 100° C. FOR 5 h |
| 2-15 | 0.09375 | Li | 0.046875 | Al | 0.046875 | 600 | 2 | 0.35 | GRINDING AND HEAT TREATMENT AT 100° C. FOR 5 h |
| 2-16 | 0.09375 | Na | 0.046875 | Al | 0.046875 | 600 | 2 | 0.35 | GRINDING AND HEAT TREATMENT AT 100° C. FOR 5 h |
| 2-17 | 0.09375 | Ki | 0.09375 | — | 0 | 600 | 2 | 0.35 | GRINDING AND HEAT TREATMENT AT 100° C. FOR 5 h |
| 2-18 | 0.09375 | — | 0 | Al | 0.09375 | 600 | 2 | 0.35 | GRINDING AND HEAT TREATMENT AT 100° C. FOR 5 h |
| 2-19 | 0.09375 | — | 0 | Al | 0.09375 | 600 | 2 | 0.35 | GRINDING AND HEAT TREATMENT AT 100° C. FOR 5 h |
| 2-20 | 0.09375 | — | 0 | Al | 0.09375 | 600 | 2 | 0.35 | NO GRINDING OR HEAT TREATMENT |
| 2-21 | 0.09375 | — | 0 | Al | 0.09375 | GRIND 2-20 AND GRANULATE | 2 | 0.35 | — |

TABLE 2-2

| No. | CARBON CONTENT [mol %] | CIRCLE EQUIVALENT DIAMETER OF OXIDE IN CONTENTS [nm] | GRADE SIZE [μm] | VOID IN GRAIN (200 nm OR MORE) PRESENCE | VOID IN GRAIN (200 nm OR MORE) AREA RATE (%) | INTERNAL RESISTANCE REDUCTION EFFECT (VOLTAGE AT 100 mAH/g) [V] |
|---|---|---|---|---|---|---|
| 2-1 | 12 | 11 | — | — | — | 2.00 |
| 2-2 | 12 | 11 | — | — | — | 2.10 |
| 2-3 | 12 | 11 | — | — | — | 2.10 |
| 2-4 | 12 | 11 | — | — | — | 3.15 |
| 2-5 | 12 | 11 | — | — | — | 2.00 |
| 2-6 | 12 | 11 | — | — | — | 2.35 |
| 2-7 | 12 | 11 | — | — | — | 3.10 |
| 2-8 | 12 | 11 | — | — | — | 2.35 |
| 2-9 | 12 | 11 | — | — | — | 3.18 |
| 2-10 | 12 | 11 | — | — | — | 2.00 |
| 2-11 | 12 | 11 | — | — | — | 3.15 |
| 2-12 | 12 | 11 | — | — | — | 3.16 |
| 2-13 | 12 | 11 | — | — | — | 3.35 |
| 2-14 | 12 | 11 | — | — | — | 3.00 |
| 2-15 | 12 | 11 | — | — | — | 3.13 |
| 2-16 | 12 | 11 | — | — | — | 3.00 |
| 2-17 | 12 | 11 | — | — | — | 3.05 |
| 2-18 | 1 | 15 | — | — | — | 3.14 |
| 2-19 | 1 | 20 | — | — | — | 3.13 |
| 2-20 | 13 | 5 | 6 | YES | 46 | 3.15 |
| 2-21 | 13 | 5 | 30 | NO | — | 3.12 |

| No. | INITIAL DISCHARGE CAPACITY [mAh/g] | STABILITY OF INTERNAL RESISTANCE REDUCTION EFFECT [V/cycle] | REMARK |
|---|---|---|---|
| 2-1 | 2.45 | 4.12 | COMPARATIVE EXAMPLE |
| 2-2 | 2.45 | 4.15 | COMPARATIVE EXAMPLE |
| 2-3 | 2.45 | 4.00 | EXAMPLE |
| 2-4 | 2.45 | 4.13 | EXAMPLE |
| 2-5 | 2.45 | 4.00 | EXAMPLE |
| 2-6 | 2.45 | 4.00 | EXAMPLE |
| 2-7 | 2.45 | 4.13 | EXAMPLE |
| 2-8 | 2.45 | 4.00 | EXAMPLE |
| 2-9 | 2.45 | 4.13 | COMPARATIVE EXAMPLE |
| 2-10 | 2.45 | 4.00 | EXAMPLE |
| 2-11 | 2.45 | 4.00 | EXAMPLE |

TABLE 2-2-continued

| | | | |
|---|---|---|---|
| 2-12 | 2.45 | 4.00 | EXAMPLE |
| 2-13 | 2.45 | 4.00 | EXAMPLE |
| 2-14 | 2.45 | 4.00 | EXAMPLE |
| 2-15 | 2.45 | 4.00 | EXAMPLE |
| 2-16 | 2.45 | 4.00 | EXAMPLE |
| 2-17 | 2.45 | 4.00 | EXAMPLE |
| 2-18 | 2.45 | 4.00 | EXAMPLE |
| 2-19 | 2.45 | 4.00 | EXAMPLE |
| 2-20 | 2.45 | 4.00 | EXAMPLE |
| 2-21 | 2.45 | 4.00 | EXAMPLE |

Third Example

Starting materials used were lithium carbonate ($Li_2CO_3$), magnesium carbonate ($MgCO_3$), cobalt oxide (CoO), silicon dioxide ($SiO_2$), boric acid ($H_3BO_3$), gamma-alumina ($Al_2O_3$), gallium oxide ($Ga_2O_3$), yttrium oxide ($Y_2O_3$), and sodium carbonate ($Na_2CO_3$). With the solid phase method, powders of the oxides shown in the composition column in Table 3 were prepared.

First, the materials were combined and weighted in such a way as to be each composition ratio shown in the composition column in Table 3 and then wet-mixed using methanol for 12 hours in a ball mill. However, when boric acid was used, the materials were dry-mixed. Each of the obtained mixtures was fired at 800° C. for 24 hours in a nitrogen atmosphere and then grounded in a planetary ball mill. The grounded powder(s) was fired at 950° C. for 12 hours in a nitrogen atmosphere. Thus, the oxide powders shown in Table 3 were prepared.

With each prepared oxide powder, 10 mass % of acetylene black was mixed. In order to mix acetylene black therewith, each prepared oxide powder and acetylene black were wet-mixed using methanol for 12 hours in a ball mill. Each of the obtained mixtures was fired at 400° C. for 5 hours in a nitrogen atmosphere.

<Analysis of Individual Samples>

The individual Samples 3-1 to 3-17 obtained as described above were analysed in the same manner as that of the first example.

Samples 3-1 to 3-17 were subjected to X-ray oaf fraction. Samples 3-1 to 3-17 shown in Table 3 had, as a main phase, a diffraction pattern similar to that of a $Li_2CoSiO_4$ crystal phase. However, in the samples which were Li excessive or element-substituted, diffraction peak shift was observed.

<Evaluation of Battery Characteristics>

Battery characteristics were evaluated an the same manner as that of the first, example except for the following point.

In the initial charge/discharge test, preliminary charge-and-discharge was repeated four times under a CC-CV condition over a voltage range of 1.0 to 5.0 V at a rate of 0.1 C, and thereafter charge was performed under the CC-CV condition at a rate of 0.1 C to 200 mAh/g, and the discharge capacity was measured to obtain the initial charge/discharge capacity.

Regarding the internal resistance reduction effect, a voltage at 100 mAh/g was found from the discharge curve from, which the initial discharge capacity was found. It was determined that the internal resistance was reduced when the voltage was high. In addition, charge-and-discharge was repeated 20 cycles, and a slope of voltage change (voltage change per cycle) at 100 mAh/g in the discharge curve from the 15th cycle to the $20^{th}$ cycle vats found as stability of the internal, resistance reduction effect.

As shown in Table 3, the voltage at 100 mAh/g of Samples 3-3 to 3-8 and 3-10 to 3-17 having more than 0 as the value of x was higher than that of Samples 3-1 and 3-2 having 0 as the value of x, and Samples 3-3 to 3-8 and 3-10 to 3-17 showed the internal resistance redaction effect. Sample 3-9 had more than 0.25 as the value of x and did not show the internal real resistance reduction effect.

Table 3 shows the result of compositions in which Al was used for electric-charge compensation in the case where the value of x was a multiple of 0.03125 and the case where the value of x was not a multiple of 0.03125. It is shown therein that when the value of x is a multiple of 0.03125, stability of the internal resistance reduction effect is excellent. The result shows that even when the element used for electric-charge compensation is other than Al, the same tendency is observed.

Samples of $Li_{2+z}(Fe_{1-y}M^A_y)(Si_{1-z}M^B_z)O_4$, $Li_{2+z}(Mn_{1-y}M^A_y)(Si_{1-z}M^B_z)O_4$, and $Li_{2+x}(Ni_{1-y}M^A_y)(Si_{1-z}M^B_z)O_4$ were also produced using, as starting materials, iron (II) oxalate dihydrate ($FeC_2O_4 \cdot 2H_2O$), manganese carbonate ($MnCO_3$), and nickel oxide (NiO), respectively, with the solid phase method described above. It was confirmed that they had the same effects as those of the above samples.

TABLE 3

| | $Li_{2+x}(Co_{1-y}M^A_y)(Si_{1-z}M^B_z)O_4$ | | | | | INTERNAL RESISTANCE REDUCTION EFFECT (VOLTAGE AT 100 mAh/g) | INITIAL DISCHARGE CAPACITY | STABILITY OF INTERNAL RESISTANCE REDUCTION EFFECT | REMARK |
|---|---|---|---|---|---|---|---|---|---|
| No. | x | $M^A$ | y | $M^B$ | z | [V] | [mAh/g] | [V/cycle] | COMPARATIVE EXAMPLE |
| 3-1 | 0 | — | 0 | — | 0 | 3.00 | 160 | −0.10 | COMPARATIVE EXAMPLE |
| 3-2 | 0 | Co(III) | 0.125 | Al | 0.125 | 2.75 | 155 | −0.12 | EXAMPLE |
| 3-3 | 0.125 | — | 0 | Al | 0.125 | 3.30 | 175 | −0.05 | EXAMPLE |
| 3-4 | 0.025 | — | 0 | Al | 0.025 | 3.20 | 170 | −0.08 | EXAMPLE |
| 3-5 | 0.03125 | — | 0 | Al | 0.03125 | 3.30 | 174 | −0.05 | EXAMPLE |
| 3-6 | 0.09375 | — | 0 | Al | 0.09375 | 3.30 | 180 | −0.05 | EXAMPLE |
| 3-7 | 0.1 | — | 0 | Al | 0.1 | 3.20 | 170 | −0.08 | EXAMPLE |
| 3-8 | 0.25 | — | 0 | Al | 0.25 | 3.30 | 173 | −0.05 | EXAMPLE |
| 3-9 | 0.3 | — | 0 | Al | 0.3 | 3.00 | 160 | −0.08 | COMPARATIVE EXAMPLE |

TABLE 3-continued

| | $Li_{2+x}(Co_{1-y}M^A_y)(Si_{1-z}M^B_z)O_4$ | | | | | INTERNAL RESISTANCE REDUCTION EFFECT (VOLTAGE AT 100 mAh/g) | INITIAL DISCHARGE CAPACITY | STABILITY OF INTERNAL RESISTANCE REDUCTION EFFECT | REMARK |
|---|---|---|---|---|---|---|---|---|---|
| No. | x | $M^A$ | y | $M^B$ | z | [V] | [mAh/g] | [V/cycle] | COMPARATIVE EXAMPLE |
| 3-10 | 0.09375 | — | 0 | B | 0.09375 | 3.28 | 174 | −0.06 | EXAMPLE |
| 3-11 | 0.09375 | — | 0 | Ga | 0.09375 | 3.27 | 172 | −0.07 | EXAMPLE |
| 3-12 | 0.09375 | — | 0 | Y | 0.09375 | 3.18 | 173 | −0.09 | EXAMPLE |
| 3-13 | 0.09375 | — | 0 | Mg | 0.09375 | 3.15 | 178 | −0.04 | EXAMPLE |
| 3-14 | 0.09375 | — | 0 | Na | 0.09375 | 3.05 | 170 | −0.07 | EXAMPLE |
| 3-15 | 0.09375 | Li | 0.46875 | Al | 0.46875 | 3.32 | 178 | −0.05 | EXAMPLE |
| 3-16 | 0.09375 | Na | 0.46875 | Al | 0.46875 | 3.12 | 171 | −0.06 | EXAMPLE |
| 3-17 | 0.09375 | Li | 0.09375 | — | 0 | 3.10 | 172 | −0.06 | EXAMPLE |

INDUSTRIAL APPLICABILITY

The present invention is usable in she field of lithium ion secondary batteries.

The invention claimed is:

1. A cathode material for a lithium ion secondary battery comprising an oxide represented by a composition formula $Li_{2+x}(M,M^A)(Si,M^B)O_4$; $Li_{2+x}(M,M^A)SiO_4$; or $Li_{2+x}M(Si,M^B)O_4$,
   wherein M represents at least one element selected from the group consisting of Fe, Mn, Co and Ni; $M^A$ and $M^B$ substitute parts of M and Si, respectively, to compensate for an electric charge equivalent to x of $Li^+$,
   wherein the $M^A$ represents a monovalent element, and the $M^B$ represents a trivalent element, a divalent element, or a monovalent element,
   wherein in the composition formula representing the oxide, $0<x\leq0.25$, and
   wherein a value of the x is a multiple of 0.03125.

2. The cathode material for a lithium ion secondary battery according to claim 1, wherein the $M^A$ represents at least one element selected from Li, Na and K, and the $M^B$ represents at least one element selected from B, Al, Ga, In, Sc, Y, Mg, Ca, Na and K.

3. The cathode material for a lithium ion secondary battery according to claim 1, wherein the oxide is represented by a composition formula $Li_{2+x}Fe(Si,M^B)O_4$ or $Li_{2+x}Mn(Si,M^B)O_4$, wherein $M^B$ represents at least one element selected from B, Al and Ga.

4. The cathode material for a lithium ion secondary battery according to claim 1, wherein
   the cathode material is a composite composed of the oxide and a carbon material, and
   the composite shows a sea-islands structure in which the oxide is scattered like islands in the carbon material, and an average circle-equivalent diameter of the islands of the sea-islands structure is 3 nm or more and 15 nm or less.

5. The cathode material for a lithium ion secondary battery according to claim 4, wherein
   the composite is a grain having a size of 1 μm or more and 20 μm or less, and
   a void exists inside the grain.

6. The cathode material for a lithium ion secondary battery according to claim 5, wherein the void having a size of 200 nm or more and less than the size of the grain exists inside the grain.

7. The cathode material for a lithium ion secondary battery according to claim 6, wherein an abundance of the void is 20% or more and 80% or less in terms of an area rate in a section of the grain.

8. A cathode member for a lithium ion secondary battery comprising a metal foil provided with a cathode layer including: the cathode material for a lithium ion secondary battery according to claim 1; and a binder.

9. A lithium ion secondary battery comprising the cathode material for a lithium ion secondary battery according to claim 1.

* * * * *